(12) United States Patent
Cho et al.

(10) Patent No.: US 11,842,027 B2
(45) Date of Patent: Dec. 12, 2023

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Seungki Cho, Suwon-si (KR); Han Kang, Suwon-si (KR); Jaemun Sim, Suwon-si (KR); Changwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/877,400

(22) Filed: Jul. 29, 2022

(65) Prior Publication Data

US 2022/0365635 A1    Nov. 17, 2022

Related U.S. Application Data

(63) Continuation of application No. PCT/KR2022/003665, filed on Mar. 16, 2022.

(30) Foreign Application Priority Data

Mar. 17, 2021    (KR) .................. 10-2021-0034481

(51) Int. Cl.
| | |
|---|---|
| *G06F 3/0481* | (2022.01) |
| *A47G 1/02* | (2006.01) |
| *G06T 7/70* | (2017.01) |

(52) U.S. Cl.
CPC ............. *G06F 3/0481* (2013.01); *A47G 1/02* (2013.01); *G06T 7/70* (2017.01); *G06T 2207/20081* (2013.01); *G06T 2207/20084* (2013.01)

(58) Field of Classification Search
CPC ............... G06F 3/0481; G06T 7/70; G06T 2207/20081; G06T 2207/20084; A47G 1/02
See application file for complete search history.

(56) References Cited

U.S. PATENT DOCUMENTS

| 10,147,393 B2 | 12/2018 | Yoon et al. |
| 10,467,949 B2 | 11/2019 | Han et al. |
| (Continued) | | |

FOREIGN PATENT DOCUMENTS

| CN | 207397618 U | 5/2018 |
| KR | 10-2018-0005862 A | 1/2018 |
| (Continued) | | |

OTHER PUBLICATIONS

Yasmina Andreu-Cabedo et al., Mirror Mirror on the Wall . . . An Intelligent Multisensory Mirror for Well-Being Self-Assessment, Jun. 1, 2015, IEEE Xplore, pp. 1-6 (Year: 2015).*

(Continued)

*Primary Examiner* — Tam T Tran
(74) *Attorney, Agent, or Firm* — Sughrue Mion, PLLC

(57) ABSTRACT

Provided is an electronic device including a first sensor configured to sense a user; a second sensor configured to sense light incident from an external light source; a mirror display; a memory; and a processor configured to: based on the first sensor sensing the user in front of the mirror display, obtain information about a first area in which a first image corresponding to a reflection of the user is located on the mirror display; determine a second area for displaying content to be provided to the user based on the information about the first area; based on information about light being obtained through the second sensor, determine luminance of the second area based on the information about the light; and (Continued)

control the mirror display to display the content with the determined luminance on the second area.

16 Claims, 10 Drawing Sheets

(56) References Cited

U.S. PATENT DOCUMENTS

| | | | |
|---|---|---|---|
| 10,758,780 | B2 | 9/2020 | Putnam |
| 2007/0124694 | A1 | 5/2007 | Van De Sluis et al. |
| 2013/0171601 | A1 | 7/2013 | Yuasa et al. |
| 2014/0270535 | A1* | 9/2014 | Hung ............... G06T 11/60 382/195 |
| 2016/0093081 | A1 | 3/2016 | Kim et al. |
| 2017/0140732 | A1* | 5/2017 | Kim ............... G02B 5/08 |
| 2018/0144718 | A1* | 5/2018 | Park ............... G02F 1/133555 |
| 2020/0066036 | A1* | 2/2020 | Choi ............... G06T 7/75 |
| 2021/0026142 | A1* | 1/2021 | Gotoh ............... A63F 13/25 |
| 2021/0033760 | A1* | 2/2021 | Cao ............... G06F 3/005 |
| 2021/0193085 | A1* | 6/2021 | Haas ............... G09G 5/10 |

FOREIGN PATENT DOCUMENTS

| | | |
|---|---|---|
| KR | 10-2018-0089646 A | 8/2018 |
| KR | 10-2106708 B1 | 5/2020 |
| KR | 10-2020-0099246 A | 8/2020 |
| KR | 10-2020-0107520 A | 9/2020 |
| KR | 10-2188766 B1 | 12/2020 |
| KR | 10-2193036 B1 | 12/2020 |
| KR | 10-2209745 B1 | 1/2021 |
| WO | 2012/039467 A1 | 3/2012 |

OTHER PUBLICATIONS

Jong-Jae Lee at al., 3D Mirrored Object Selection for Occluded Objects in Virtual Environments, Jan. 1, 2020, IEEE Access, vol. 8 pp. 200259-200270 (Year: 2020).*

International Search Report and Written Opinion dated Jun. 24, 2022, issued by the International Searching Authority in International Application No. PCT/KR2022/003665 (PCT/ISA/210 and PCT/ISA/237).

* cited by examiner

ELECTRONIC DEVICE AND CONTROLLING METHOD OF ELECTRONIC DEVICE

CROSS-REFERENCE TO RELATED APPLICATIONS

This application is a bypass continuation of International Application No. PCT/KR2022/003665, filed on Mar. 16, 2022, which is based on and claims priority to Korean Patent Application No. 10-2021-0034481, filed on Mar. 17, 2021, in the Korean Intellectual Property Office, the disclosure of which is incorporated by reference herein in its entirety.

BACKGROUND

1. Field

This disclosure relates to an electronic device and a controlling method thereof, and more particularly, to an electronic device that may improve visibility of reflected content viewed on a mirror display and a controlling method thereof.

2. Description of Related Art

An electronic device equipped with a mirror display capable of displaying content while performing a mirror function has been developed. Specifically, the mirror display reflects light incident on the mirror display from an external light source to perform a mirror function, while displaying content/information stored in the electronic device.

However, when an image corresponding to a reflection of a user in front of the mirror display is reflected off of the mirror display according to the mirror function for viewing by the user, there may be a problem in that the visibility of the content/information displayed by the electronic device may be degraded by light incident from the external light source and/or the user image.

Accordingly, there is need to improve the visibility of the content/information displayed on the mirror display in consideration of the effect of light incident from the external light source and/or the user image.

SUMMARY

Provided are an electronic device that may improve visibility of content displayed on a mirror display and a controlling method thereof.

According to an aspect of the disclosure, a first electronic device may include a first sensor configured to sense a user; a second sensor configured to sense light incident from an external light source; a mirror display; a memory; and a processor configured to: based on the first sensor sensing the user in front of the mirror display, obtain information about a first area in which a first image corresponding to a reflection of the user is located on the mirror display, determine a second area for displaying content to be provided to the user based on the information about the first area, based on information about light being obtained through the second sensor, determine luminance of the second area based on the information about light, and control the mirror display to display the content with the determined luminance on the second area.

The information about the first area my include information about a size of the first area and information about a position of the first area. The processor may be further configured to determine a position and a size of the second area based on the information about the size of the first area and the information about the position of the first area.

The information about light may include information about a direction of light and information about an intensity of light. The processor may be further configured to: determine the position and the size of the second area based on the information about the first area and the information about the direction of the light, and determine luminance of the second area based on the information about the intensity of light.

The first sensor may include an image sensor, and the processor may be further configured to: obtain a second image corresponding to the user through the image sensor, obtain information about a pose of the user by inputting the second image into a trained neural network model, and determine the position and the size of the first area based on the information about the pose of the user.

The processor may be further configured to identify types of a plurality of objects within the content, respectively, by inputting data about the content to a trained neural network model, and determine luminance of areas corresponding to each of the plurality of objects in the second area based on the information about light and the types of each of the plurality of objects.

The processor may be further configured to determine luminance of the second area based on the information about light, the information about types of the content, and information about brightness of the content.

The processor may be further configured to: determine a position of a user interface to control the content based on the information about the first area and the information about the second area, and control the mirror display to display the user interface at the determined position.

The processor may be further configured to: identify whether the user is a pre-registered user based on user data stored in the memory, based on the user being the pre-registered user, identify the content based on the user data corresponding to the pre-registered user, and control the mirror display to display the identified content on the second area.

The electronic device may further include a communication interface. The user data may be health-related data received from an external device through the communication interface, and the content may include recommended content corresponding to the health-related data.

The processor may be further configured to: process the content so that a boundary area between the first area and the second area is blended, and control the mirror display to display the processed content on the second area.

According to another aspect of the disclosure, a method of controlling an electronic device comprising a mirror display may include based on a user on in front of the mirror display being sensed, obtaining information about a first area in which a first image corresponding to a reflection of the user is located on the mirror display; determining a second area for displaying content to be provided to the user based on the information about the first area; based on information about light being obtained through a second sensor, determining luminance of the second area based on the information about light; and displaying the content with the determined luminance on the second area.

The information about the first area may include information about a size of the first area and information about a position of the first area. The determining the second area may include determining a position and a size of the second area based on the information about the size of the first area and the information about the position of the first area.

The information about light may include information about a direction of light and information about an intensity of light. The determining the second area may include determining the position and the size of the second area based on the information about the first area and the information about the direction of the light. The determining luminance of the second area comprises determining luminance of the second area based on the information about the intensity of light.

The method may further include obtaining a second image corresponding to the user; obtaining information about a pose of the user by inputting the second image to a trained neural network model; and determining the position and the size of the first area based on the information about the pose of the user.

The content may include content including a plurality of objects, and th determining the second area further may include identifying types of the plurality of objects, respectively, by inputting data about the content to a trained neural network model; and determining luminance of areas corresponding to each of the plurality of objects in the second area based on the information about light and the types of each of the plurality of objects.

According to yet another aspect of the disclosure, an electronic device may include a first sensor configured to sense a user; a second sensor configured to sense light incident from an external light source; a mirror display configured to provide a visible reflection of the user while also displaying content; a memory; and a processor configured to: based on the first sensor sensing the user in front of the mirror display, obtain information about a location of a reflection of the user from a perspective of the user, determine a displaying area for displaying content to be provided to the user based on information about the location of the reflection of the user, and control the mirror display to display the content on the displaying area.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
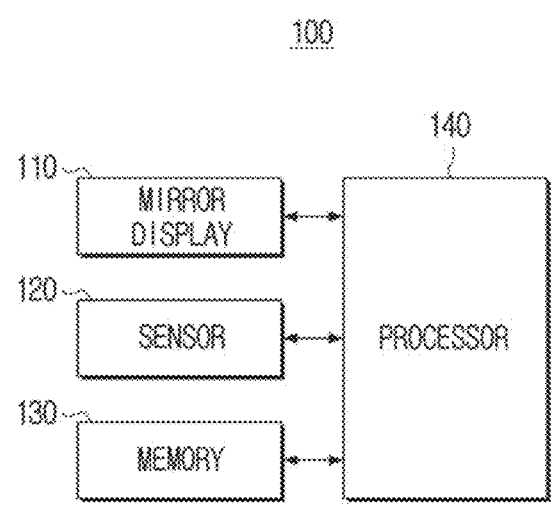
FIG. 1 is a block diagram of a configuration of an electronic device, according to an embodiment of the disclosure.

Hereinafter, embodiments of the disclosure will be described with reference to the accompanying drawings. However, it may be understood that the disclosure is not limited to the embodiments described hereinafter, but also includes various modifications, equivalents, and/or alternatives of the embodiments of the disclosure. In relation to explanation of the drawings, similar drawing reference numerals may be used for similar constituent elements.

When it is decided that a detailed description for the known art related to the disclosure may unnecessarily obscure the gist of the disclosure, the detailed description may be omitted.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In this specification, the expressions "have," "may have," "include," "may include," or "comprise" or the like represent presence of a corresponding feature (for example: components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not limit the components.

Description of a certain element (e.g., first element) being "operatively or communicatively coupled with/to" or being "connected to" another element (e.g., second element) should be understood to mean that the certain element may be connected to the other element directly or through still another element (e.g., third element).

On the other hand, description of a certain element (e.g., first element) being "directly coupled to" or "directly connected to" another element (e.g., second element) may be understood to mean that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be provided in an individual hardware, the components may be integrated in at least one module or chip and be provided in at least one processor.

Various elements and areas in the figures are shown out of scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

FIG. 1 is a block diagram of a configuration of an electronic device according to an embodiment of the disclosure.

As shown in FIG. 1, an electronic device 100 according to an embodiment may include a mirror display 110, a sensor 120, a memory 130, and a processor 140.

The electronic device 100 may be implemented as a mirror display 110 having a shape such as a stand-type mirror. However, the electronic device 100 is not limited to the type and shape of the electronic device 100 of the disclosed embodiments, and the electronic device 100 may be implemented as a TV or a smartphone.

The mirror display 110 may be configured to display content while performing a mirror function. That is, an image corresponding to an object disposed in front of the mirror display 110 may be off of the mirror display 110, and content stored in the memory 130 may be displayed like a conventional display while an image corresponding to an object disposed on the front surface of the mirror display 110 is displayed. The mirror display 110 may include a display panel and a mirror panel disposed on the display panel, and may further include a touch screen panel disposed on the mirror panel.

When the light incident from the external light source is reflected on the mirror display 110, an image corresponding to an object positioned in front of the mirror display 110 may be reflected off of one area of the mirror display 110. In other words, if the object is positioned in front of the mirror display 110, a reflection of the object may be provided on one area on the mirror display 110. When a user input for displaying content is received or an event for displaying content is generated, the mirror display 110 may display content stored in the memory 130. The content stored in the memory 130 may include not only content obtained by the electronic device 100 and stored in the memory 130, but also content received from an external device and stored in the electronic device 100.

The sensor 120 may be configured to sense various information within or outside the electronic device 100. The sensor 120 may include one or more sensors 120, and may include a first sensor 120 for sensing a user and a second sensor 120 for sensing light incident from an external light source. The first sensor 120 may include at least one of an image sensor 120, a proximity sensor 120, and an infrared sensor 120. The second sensor 120 may include at least one of an illuminance sensor 120 and a color sensor 120. The sensor 120 may include various types of sensors 120, such as a global positioning system (GPS) sensor 120, a gyro sensor 120, an acceleration sensor 120, a LiDAR sensor 120, an inertial measurement unit (IMU) 120, a motion sensor 120, or the like.

At least one instruction regarding the electronic device 100 may be stored in the memory 130. In addition, an operating system (O/S) for driving the electronic device 100 may be stored in the memory 130. The memory 130 may store various software programs or applications for operating the electronic device 100 according to various embodiments. The memory 130 may include a semiconductor memory such as a flash memory, a magnetic storage medium such as a hard disk, or the like.

Specifically, the memory 130 may store various software modules for operating the electronic device 100, and the processor 140 (e.g., at least one processor) may control the operation of the electronic device 100 by executing various software modules that are stored in the memory 130. That is, the memory 130 may be accessed by the processor 140, and may perform reading, recording, modifying, deleting, updating, or the like, of data by the processor 140.

The term memory 130 may be used to refer to any volatile or non-volatile memory, a ROM, RAM proximate to or in the processor 140 or a memory card (for example, a micro secure digital (SD) card, a memory stick) mounted to the electronic device 100.

In various embodiments, the memory 130 may store various information or data as described below. The memory 130 may store information about a user sensed through the first sensor 120, information on the direction and intensity of the light sensed through the second sensor 120, information on the position and size of the first area 21, information on the position and size of the second area 22, information on the luminance of the second area 22, a plurality of content, or the like. The memory 130 may store various types of user data. Specific, non-limiting examples and embodiments of user data will be described in detail with reference to FIG. 9.

Various information required within a range for achieving the purpose of the disclosure may be stored in the memory 130, and information stored in the memory 130 may be received from an external device or updated by being received by a user.

The processor 140 may control overall operations of the electronic device 100. Specifically, the processor 140 may be connected to a configuration of the electronic device 100 including the mirror display 110, the sensor 120, and the memory 130 as described above, and may control overall operations of the electronic device 100 by executing at least one instruction stored in the memory 130 as described above.

The processor 140 may be implemented in various ways. For example, the processor 140 may be implemented as at least one of an application specific integrated circuit (ASIC), an embedded processor, a microprocessor, a hardware control logic, a hardware finite state machine (FSM), a digital signal processor (DSP), or the like. Further, processor 140 may include at least one of a central processing unit (CPU), a graphic processing unit (GPU), a main processing unit (MPU), or the like.

According to an embodiment, the processor 140 may sense the user in front of the mirror display 110 through the first sensor 120. The processor 140 may sense a user in front of the mirror display 110 through at least one of the image sensor 120, the proximity sensor 120, and the infrared sensor 120 included in the first sensor 120.

As shown in FIGS. 3 through 8, when the user is located in front of the mirror display 110, the first image 11 corresponding to the user may be reflected off of one area of the mirror display 110 as the light incident from the external light source is reflected on the mirror display 110. Hereinafter, as the light incident from the external light source is reflected on the mirror display 110, the user image reflected off of one area of the mirror display 110 is referred to as the "first image 11."

When the user 10 in front of the mirror display 110 is sensed, the processor 140 may obtain information on a first area 21 on which a reflection of the user is reflected off of the mirror display 110. The information on the first area 21 may include information on the size of the first area 21 and information on the position of the first area 21. The location of the first area 21 may be based on a position of the user, such as a position of the user's eyes. That is, the first area 21 may be based on a perspective of a user.

The processor 140 may determine a second area 22 for displaying content to be provided to the user 10 based on information about the first area 21. The processor 140 may determine the position and size of the second area 22 for displaying the content on the basis of the information on the size of the first are 21 and the information on the position of the first area 21. According to an embodiment, the second area 22 may be determined as an area among areas on the mirror display 110 that is not overlapped with the first area 21.

The processor 140 may obtain information on light incident from an external light source 30 through the second sensor 120. The information on the light may include information on the direction of the light and information on the intensity of the light.

When information about the light is obtained through the second sensor 120, the processor 140 may determine the luminance of the second area 22 based on the information about the light and display the content on the second area 22. According to an embodiment, the processor 140 may determine the luminance of the second area 22 so as to correspond to the intensity of light incident on the second area 22, and display the content with determined luminance on the second area 22.

Various embodiments based on the control of the processor 140 will be further described with reference to FIGS. 2 to 9.

Figure 2:
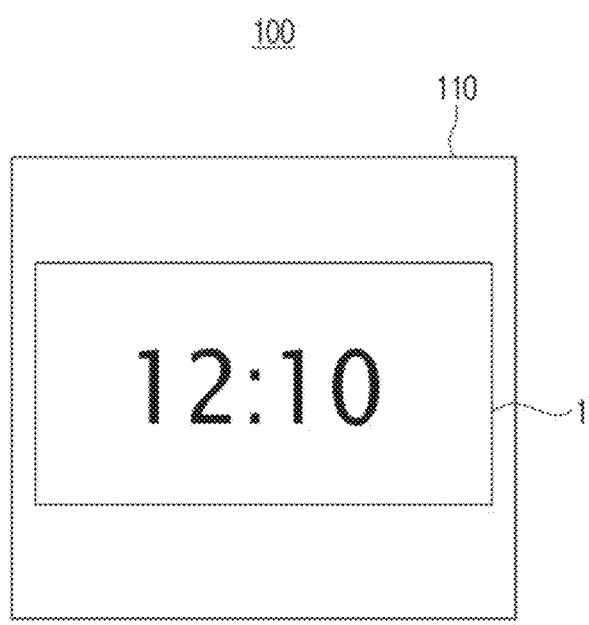
FIGS. 2, 3, and 4 shown an operation of an electronic device, according to an embodiment of the disclosure.
Figure 3:
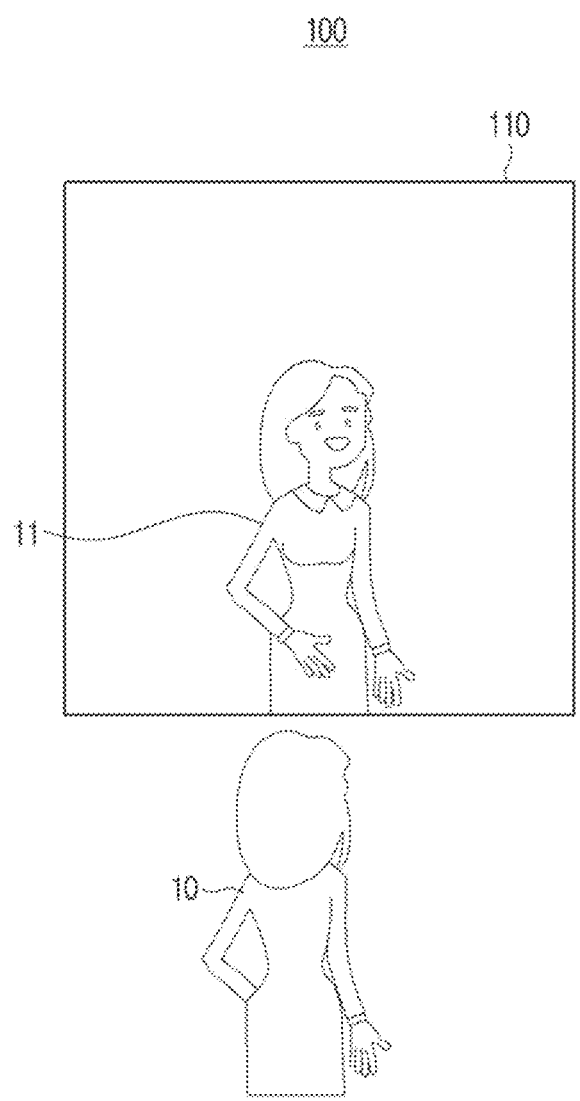
Figure 4:
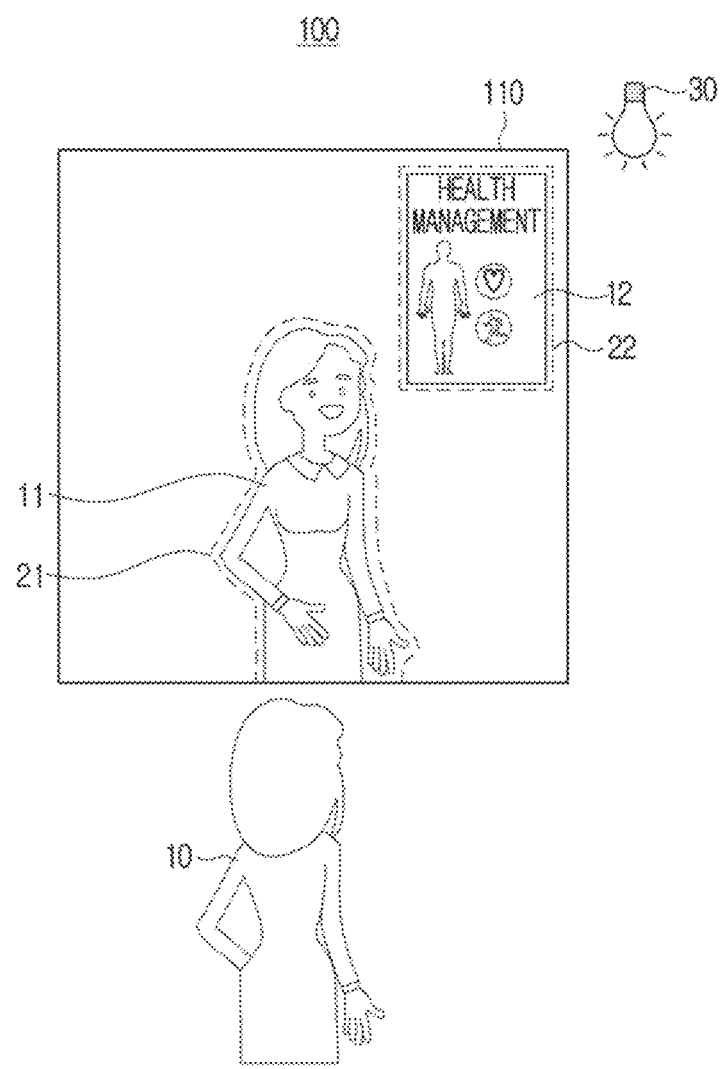

FIGS. 2, 3, and 4 show an operation of an electronic device according to an embodiment of the disclosure.

When the user 10 is not located in front of the mirror display 110, the processor 140 may control the mirror display 110 to display a standby screen 1 as shown in FIG. 2. For example, the standby screen 1 may include information about the current time, as shown in FIG. 2, and may include various information such as information on the current weather.

When the user 10 approaches the front of the mirror display 110 while the standby screen 1 is displayed, as shown in FIG. 3, the first image 11 corresponding to a reflection of the user 10 may be reflected off of one area of the mirror display 110 as the light incident from the external light source 30 is reflected on the mirror display 110. When the first image 11 is displayed in one area of the mirror display 110, the processor 140 may stop displaying of the standby screen 1, as shown in FIG. 3.

The processor 140 may sense the user 10 in front of the mirror display 110 through the first sensor 120. The processor 140 may obtain an image of a scene in front of the mirror display 110 through the image sensor 120 included in the first sensor 120, perform object recognition on the obtained image, and sense the user 10 in front of the mirror display 110. The processor 140 may sense the user 10 in front of the mirror display 110 through at least one of the proximity sensor 120 and the infrared sensor 120 included in the first sensor 120.

When the user 10 in front of the mirror display 110 is sensed, the processor 140 may obtain information on the first area 21 of the mirror display 110. The processor 140 may identify pixels of the mirror display 110 corresponding to the first image 11 and identify the position and size of the first area 21 including the identified pixels. As shown in FIG. 4, the first area 21 may be an area of the center of the mirror display 110.

The processor 140 may determine a second area 22 for displaying content to be provided to the user 10 based on information about the first area 21. The processor 140 may determine the position and size of the second area 22 for displaying the content on the basis of the information on the size of the first area 21 and the information on the position of the first area 21. As shown in FIG. 4, the content to be provided to the user 10 may include health-related data related to health of the user 10, and the second area 22 may be determined as a right top area of the mirror display 110 among the areas on the mirror display 110 that are not overlapped with the first area 21.

The processor 140 may obtain information on light incident from the external light source 30 through the second sensor 120. The information on the light may include information on the direction of the light and information on the intensity of the light. When information about the light is obtained through the second sensor 120, the processor 140 may determine the luminance of the second area 22 based on the information about the light and display the content on the second area 22 with the determined luminance.

The visibility of the user 10 with respect to the content displayed on the second area 22 may vary depending on the direction and intensity of the light incident from the external light source 30. For example, when a strong intensity of light is incident on the mirror display 110 from the external light source 30 disposed in the right upper direction of the electronic device 100, the visibility of the user 10 with respect to the content displayed on the second area 22 at the right upper end of the mirror display 110 may be lowered.

The processor 140 may adaptively determine the luminance of the second area 22 according to the direction and intensity of the light incident from the external light source 30, thereby increasing the visibility of the user 10 with respect to the content displayed on the second area 22. The processor 140 may determine the luminance of the second area 22 so as to correspond to the intensity of light incident on the second area 22. According to an embodiment, the processor 140 may determine the brightness of the second area 22 to be proportional to the intensity of light incident on the second area 22. According to another embodiment, data for a luminance level corresponding to each of a plurality of levels according to the intensity of light may be prestored in the memory 130, and the processor 140 may determine the luminance of the second area 22 according to a luminance level corresponding to a level of the intensity of light incident on the second area 22.

According to the embodiment described above with reference to FIGS. 2 to 4, the electronic device 100 may determine an area for displaying content to be provided to the user 10 on the basis of the information on the area in which the user image is displayed according to the mirror function, and adjust the luminance of the area for displaying the content on the basis of the information on the light incident on the mirror display 110, thereby improving visibility of the user 10 with respect to the content displayed on the mirror display 110.

Figure 5:
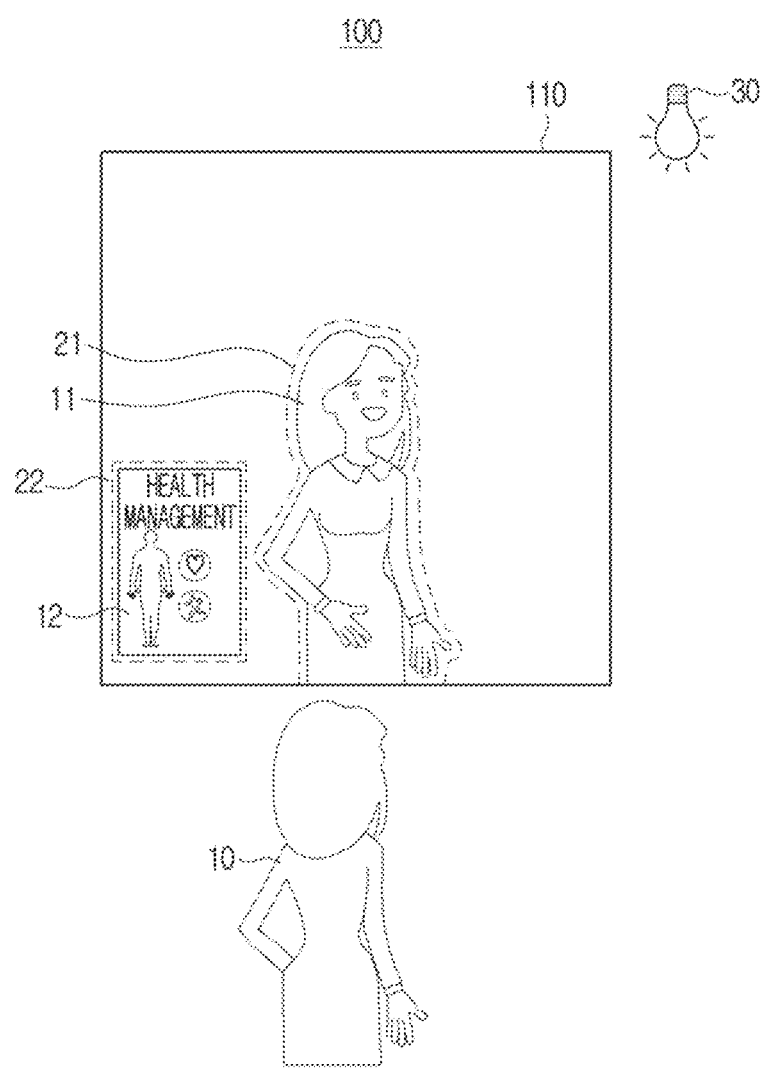
FIG. 5 is a diagram of an operation of the electronic device for determining a second area, according to an embodiment of the disclosure.

FIG. 5 is a diagram showing an embodiment for determining a second area.

Referring to FIGS. 2 to 4, the second area 22 is determined based on the information on the first area 21, but this is merely exemplary and it is not necessary to use only the information about the first area 21 in determining the second area 22 according to the disclosure. According to another embodiment of the disclosure, the processor 140 may determine the second area 22 using information on light incident from the external light source 30 along with information about the first area 21.

As described above, when the user 10 approaches the front surface of the mirror display 110, the first image 11 corresponding to the user 10 may be reflected off of one area of the mirror display 110. When the user 10 in front of the mirror display 110 is sensed, the processor 140 may obtain information on the first area 21 of the mirror display 110. The processor 140 may obtain information on light incident from the external light source 30 through the second sensor 120.

When the information about the first area 21 and the information about the light are obtained, the processor 140 may determine the position and size of the second area 22 based on the information about the first area 21 and the information about the light, and determine the luminance of the second area 22 based on the information about the light.

For example, as shown in FIG. 5, when light of strong intensity is incident on the mirror display 110 from the external light source 30 disposed in the upper right direction of the electronic device 100, in particular, the visibility of the user 10 with respect to the content displayed on the upper right area of the display 110 may be reduced, and the visibility of the user 10 with respect to the content displayed on the lower left area of the mirror display 110 may be relatively high. Accordingly, the processor 140 may select one area of the lower left side of the mirror display 110 instead of the upper right side of the mirror display 110 among the areas on the mirror display 110 that do not overlap the first area 21 as the second area 22.

However, the embodiment of FIG. 5 is merely an embodiment, and the second area 22 may be determined as an area of a left upper end or a right lower end of the mirror display 110, and at least a portion of the second area 22 may be determined to overlap at least a portion of the first area 21. If at least a portion of the second area 22 is determined to overlap at least a portion of the first area 21, the processor 140 may process the content such that the boundary area between the first image 11 reflected off of the first area 21 and the content displayed on the second area 22 is blended.

The processor 140 may determine the second area 22 based on information on the gaze of the user 10. The processor 140 may obtain information on the gaze of the user 10 through the sensor 120, and determine one area including the position on the mirror display 110 corresponding to the gaze of the user 10 as the second area based on the information on the gaze of the user 10.

According to the embodiment described above with reference to FIG. 5, the electronic device 100 may improve the visibility of the user 10 with respect to the content displayed on the mirror display 110 by determining the area for displaying the content to be provided to the user 10 using the information on the area in which the user image is displayed according to the mirror function and information about light incident on the mirror display 110.

Figure 6:
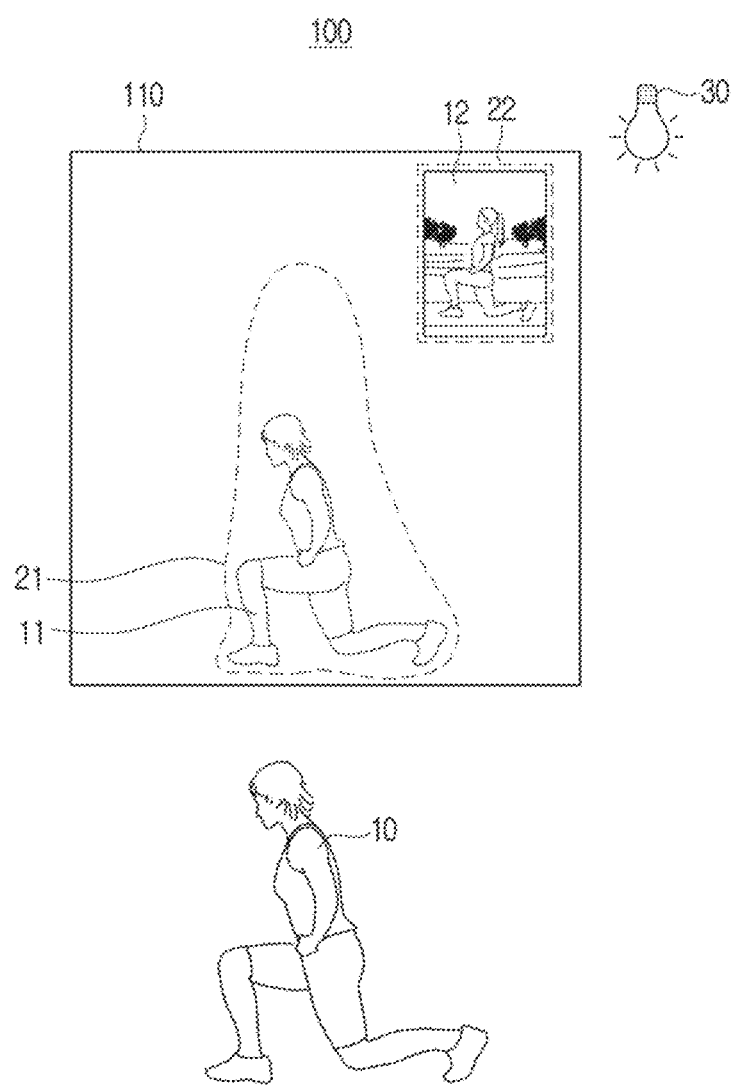
FIG. 6 is a diagram of an operation of the electronic device for determining a first area according to an embodiment of the disclosure.

FIG. 6 is a diagram showing an embodiment for determining a first area.

Based on assumption that the motion of the user 10 in front of the mirror display 110 is not large, a method of obtaining information about the first area 21 in which the first image 11 is reflected off of the mirror display 110 is described, but if a motion of the user 10 is large, an area on which content is displayed by the user image reflected off of the mirror display 110 may be largely restricted. Accordingly, the processor 140 may determine a first area 21 for displaying content using information about the pose of the user 10.

In detail, the first sensor 120 may include the image sensor 120, and the processor 140 may obtain a second image corresponding to the user 10 through the image sensor 120. The image sensor 120 may refer to the sensor 120 capable of converting light entering through the lens of the camera into an electrical image signal, and may be included as one component of the camera. In the disclosure, obtaining the second image through the image sensor 120 may be replaced by obtaining a second image through the camera.

The user image obtained through the image sensor 120 is referred to as "second image" by distinguishing from the term first image 11 which refers to a user image reflected off of an area of the mirror display 110 as the light incident from the external light source 30 is reflected on the mirror display 110.

Once the second image is obtained, the processor 140 may input the second image into a trained first neural network model to obtain information about the pose of the user 10. The "first neural network model" refers to a model trained to obtain information about the pose of the user 10 included in the user image based on the inputted user image. Specifically, the processor 140 may detect the user 10 included in the second image through the first neural network model and obtain image data for an area including the user 10. The processor 140 may obtain pose information for the user 10 based on information on a feature point or skeleton of the user 10 included in the image data.

If information about the pose of the user 10 is obtained as described above, the processor 140 may determine the position and size of the first area 21 based on the information on the pose of the user 10. The processor 140 may estimate an area in which the first image 11 is displayed according to the pose of the user 10 during a predetermined period on the basis of the information about the pose of the user 10, and determine the estimated area as the first area 21. For example, as shown in FIG. 6, the processor 140 may estimate that the first image 11 may reach the upper portion of the mirror display 110 during a predetermined period based on information about the pose of the user 10, thereby determining the area 21 as shown in FIG. 6 as the second area 22. Here, the predetermined period may be changed by a developer or setting of the user 10.

As described above, if the first area 21 is determined based on the information on the pose of the user 10, the processor 140 may determine the second area 22 for displaying the content based on the information about the first area 21, determine the luminance of the second area 22 based on the information about the light, and display the content on the second area 22 with the determined luminance. For example, as shown in FIG. 6, the second area 22 may be determined as the right top area of the mirror display 110 among the areas on the mirror display 110 that are not overlapped with the first area 21.

The processor 140 may identify the content to be provided to the user 10 based on information about the pose of the user 10. The processor 140 may estimate an exercise motion of the user 10 based on information about the pose of the user 10 and identify content corresponding to the estimated motion. For example, as shown in FIG. 6, if the user 10 is assumed to perform a "lunge" movement on the basis of the information about the pose of the user 10, the processor 140 may identify recommended content for guiding the "lunge" movement and control the mirror display 110 to display the identified recommendation content on the second area 22.

Referring to FIG. 6, the electronic device 100 may determine an area in which the user image is displayed according to a mirror function during a predetermined interval on the basis of the information about the pose of the user 10, and in particular, when the movement of the user 10 is large, it is possible to prevent the area displayed on the mirror display 110 from being restricted by the user image reflected off of the mirror display 110.

Figure 7:
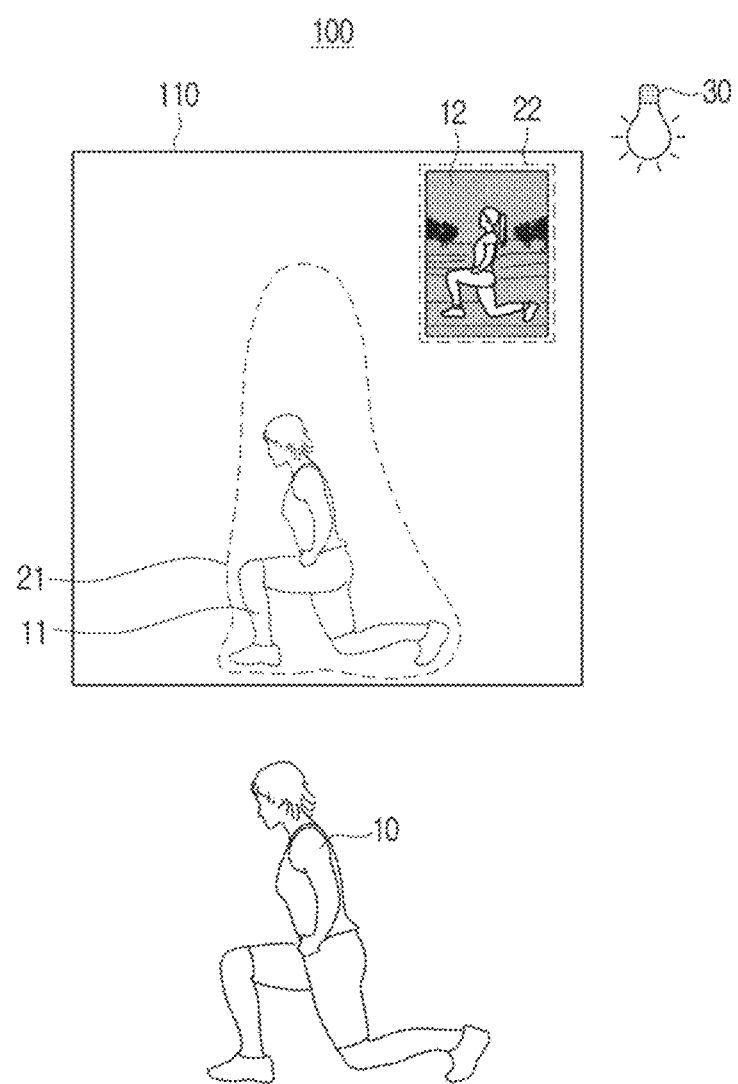
FIG. 7 is a diagram of an operation of the electronic device for determining brightness differently for each object included in the content, according to an embodiment of the disclosure.

FIG. 7 is a diagram showing an embodiment for determining brightness differently for each object included in the content.

In the above, information on the light incident from the external light source 30 may be obtained through the second sensor 120, and the content is displayed by determining the luminance of the second area 22 to correspond to the intensity of light incident on the second area 22, more specifically, the luminance of the second area 22 may be determined differently depending on the object included in the content. Hereinafter, in the description of FIG. 7, similarly to the description of FIG. 6, the second area 22 is determined as an upper right area of the mirror display 110 among the areas on the mirror display 110 which is not overlapped with the first area 21.

Specifically, as shown in FIG. 7, the content displayed on the second area 22 may include a plurality of objects. As an example, the plurality of objects may be divided into a "person" and a "background". The processor 140 may input data on the content into the trained second neural network model to identify the types of each of the plurality of objects included in the content. Here, the "second neural network model" is a neural network trained to output information on the probability that a plurality of objects included in the content correspond to each of a plurality of predefined classes (or categories, domains) based on the data on the content.

The processor 140 may determine the luminance of the second area 22 for each area corresponding to each of the plurality of objects included in the content based on the information about the light and the type of each of the plurality of objects. For example, as shown in FIG. 7, when the external light source 30 is disposed on the right upper end of the electronic device 100, the visibility of the user 10 with respect to the content displayed on the second area 22 on the right upper end of the mirror display 110 may deteriorate. As shown in FIG. 7, the processor 140 may determine the luminance of a "person" among the plurality of objects included in the content to be high, and determine the luminance of the "background" to be low.

The processor 140 may determine the luminance of the second area 22 based on the information on the light, the information on the type of content, and the brightness of the content. The memory 130 may store information about the type of the content (or genre) and luminance corresponding to the brightness, and the processor 140 may determine the luminance of the second area 22 by using the information on the luminance corresponding to the type and brightness of the content together with the information on the light. For example, if the content is "battle movie" and the average brightness of the image frame included in the content is less than a predetermined threshold value, the processor 140 may determine the luminance of the second area 22 relatively lower than when the luminance of the second area 22 is determined based on only information about the light.

According to the embodiment described above with reference to FIG. 7, the electronic device 100 may substantially improve the user's 10 visibility of the content by differently determining the luminance of an area in which the content is displayed according to an object included in the content.

Figure 8:
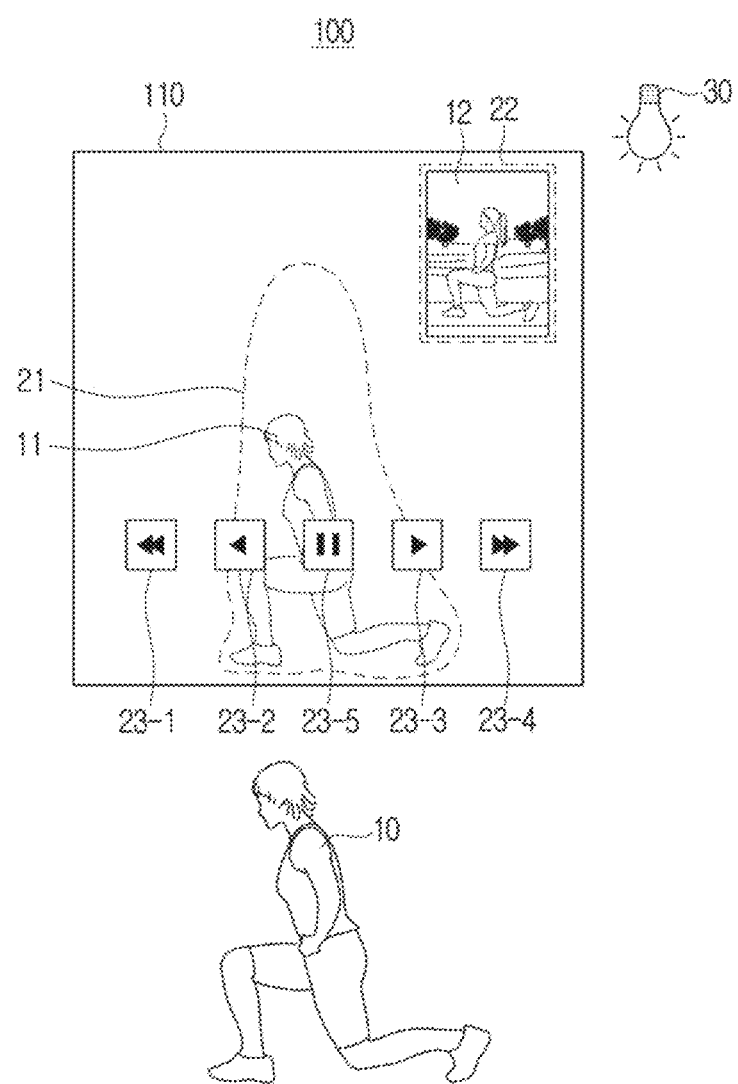
FIG. 8 is a diagram of an operation of the electronic device for displaying a user interface for controlling content, according to an embodiment of the disclosure.

FIG. 8 shown an operation of displaying a user interface for controlling content, according to an embodiment.

In the above description, the first image 11 corresponding to the user 10 in front of the mirror display 110 is reflected off of the first area 21 and the content to be provided to the user 10 is displayed on the second area 22, but a user interface (UI) for controlling the content may be displayed on the mirror display 110. Hereinafter, as shown in FIG. 8, the first area 21 is determined as the center area of the mirror display 110 and the second area 22 is determined as the right upper area of the mirror display 110 among the areas on the mirror display 110, which is not overlapped with the first area 21.

The processor 140 may control the mirror display 110 to determine the position of the user 10 interface for controlling the content based on the information about the first area 21 and the information about the second area 22, and to display the user 10 interface at the determined position. For example, the processor 140 may control the mirror display 110 to display the user 10 interface on an area overlapping a portion of the first area 21 where the first image 11 corresponding to the user 10 is provided to facilitate the touch input of the user 10.

The user interface may include a plurality of UI items 23-1, 23-2, 23-3, 23-4, 23-5 for controlling the content displayed on the second area 22.

As shown in FIG. 8, the user interface may include a UI item 23-1 corresponding to a "rewind" function, a UI item 23-2 corresponding to a function of "moving to a previous content", a UI item 23-3 corresponding to a function of "moving to the next content", a UI item 23-4 corresponding to a "fast forward" function, and a UI item 23-5 corresponding to "play/pause" function. The UI item 23-2 corresponding to a function of "moving to the previous content" and the UI item 23-5 corresponding to the "play/pause" function may overlap a portion of the first area 21 on which the first image 11 is displayed. In this example, the processor 140 may process an image corresponding to the UI items 23-2 and 23-5 such that a boundary area between the UI items 23-2 and 23-5 is blended, thereby harmonizing the UI item with the first image 11.

The processor 140 may process an image corresponding to the UI items 23-2 and 23-5 such that the boundary area between the first image 11 and the UI items 23-2 and 23-5 may be blended, but may process the content to be blended with the boundary area between the first image 11 and the content. The processor 140 may process the content so that a boundary area between the first area 21 and the second area 22 is blended, and control the mirror display 110 to display the processed content on the second area 22.

According to the embodiment described above with reference to FIG. 8, the electronic device 100 may display a user image reflected off of the mirror display 110 according to a mirror function, and a user interface for controlling the content together with the content to be provided to the user 10, thereby improving the convenience of the user 10.

Figure 9:
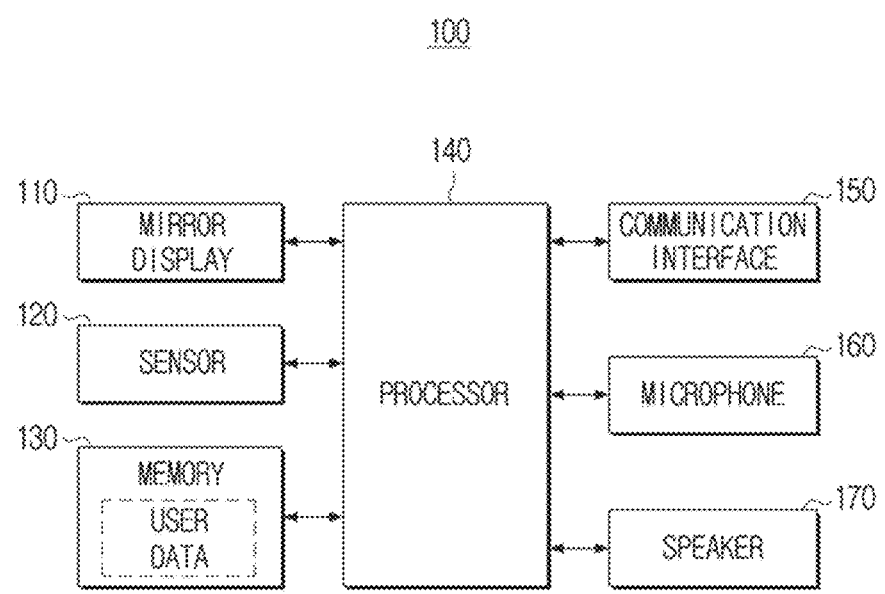
FIG. 9 is a block diagram illustrating details of an electronic device according to an embodiment of the disclosure.

FIG. 9 is a block diagram showing details of an electronic device according to an embodiment.

As shown in FIG. 9, the electronic device 100 according to an embodiment may further include a communication interface 150, a microphone 160, and a speaker 170 as well as the mirror display 110, the sensor 120, the memory 130, and the processor 140. The mirror display 110, the sensor 120, the memory 130, and the processor 140 have been described above with reference to FIGS. 1 to 8, and a duplicate description will be omitted. However, prior to describing the communication interface 150, the microphone 160, and the speaker 170, the "user data" stored in the memory 130 and the embodiments related thereto will be described.

As shown in FIG. 9, the memory 130 may store user data according to the disclosure. Here, "user data" is used to collectively refer to various data related to the user 10 of the electronic device 100. Specifically, the user data may include identification information, personal information, and health-related information of the user 10.

The "identification information" may include a face image, fingerprint data, iris data, and account information for identifying the user 10. The "user personal information" may include information about the personal information of the user 10 and information about a schedule of the user 10, or the like. The "health-related information" may include information on the heart rate of the user 10, information on the body temperature of the user 10, information on the weight of the user 10, information on the body component of the user 10, information on the sleep pattern of the user 10, information on the stress of the user 10, information on the hormone of the user, information on the emotion of the user 10, information on the exercise history of the user 10, information on the exercise history of the user 10, and the like.

The user data may be obtained through various types of sensors 120 included in the electronic device 100, may be obtained through various types of sensors 120 included in the external device, and may be received from an external device through the communication interface 150 of the electronic device 100. Here, the external device may be a user terminal, such as a smart phone, a smart watch, or the like, or may be a cloud server or an edge computing device configured to store/manage user data.

According to an embodiment, the processor 140 may identify whether the user 10 in front of the mirror display 110 is the pre-registered user 10 based on the user data. The processor 140 may identify whether the user 10 of the front surface of the mirror display 110 is the pre-registered user 10 depending on whether the identification information stored in the memory 130 is matched with the identification information (e.g., face image, fingerprint data, or iris data) obtained through the sensor 120. In addition, the processor 140 may identify whether the user 10 is the pre-registered user 10 according to whether the account information stored in the memory 130 matches the account information input by the user 10.

When it is identified that the user 10 of the front surface of the mirror display 110 is not the pre-registered user 10, the processor 140 may control the mirror display 110 to display a basic screen including information on the current time, the current weather, or the like.

When the user 10 of the front surface of the mirror display 110 is identified as the pre-registered user 10, the processor 140 may output the greeting message based on the personal information of the user 10. For example, the processor 140 may control the mirror display 110 to display a greeting message, such as "Hello, Mr. Kim", and may output a voice signal corresponding to the "Hello, Mr. Kim" through the speaker 170.

If the user 10 of the front surface of the mirror display 110 is the pre-registered user 10, the processor 140 may control the mirror display 110 to display health related data corresponding to the pre-registered user 10. The processor 140 may control the mirror display 110 to display information on the heart rate of the user 10, information on the body temperature of the user 10, information on the weight of the user 10, information on the body component of the user 10, information on the sleep pattern of the user 10, information on the stress of the user 10, information on the hormone of the user, information on the emotion of the user 10, information on the exercise history of the user 10, information on the exercise history of the user 10, and the like, who is identified as the pre-registered user 10.

If the user 10 on the front of the mirror display 110 is the pre-registered user 10, the processor 140 may identify the content to be provided to the user 10 based on health-related data corresponding to the pre-registered user 10 and control the mirror display 110 to display the identified content on the second area 22. The processor 140 may identify content such as content that has been recently played by the user 10 that is identified as the pre-registered user 10 among the content stored in the memory 130, content set to be preferred by the user 10, recommendation content corresponding to at least some of the health-related information of the user 10, and to display at least one content of the identified content on the second area 22.

The process of identifying the recommended content to be provided to the user 10 based on the user data may be performed through the trained third neural network model. The "third neural network model" is trained to identify content corresponding to the personal information and the health-related data of the user 10, and the electronic device 100 may identify recommended content to be provided to the user 10 using the third neural network model.

While the content provided to the user 10 is stored in the memory 130 of the electronic device 100, the content provided to the user 10 may be stored in the external device, and the electronic device 100 may receive the content from the external device and may provide the received content to the user 10.

According to an embodiment as described above, when the user 10 of the front surface of the mirror display 110 is the pre-registered user 10, the electronic device 100 may provide personalized health-related data and content to the user 10 of the front surface of the mirror display 110 based on the user data, thereby contributing to the health condition management/improvement of the user 10.

The communication interface 150 may include a circuit and may perform communication with an external device. The processor 140 may receive various data or information from an external device connected through the communication interface 150, and may transmit various data or information to an external device.

The communication interface 150 may include at least one of a Wi-Fi module, a Bluetooth module, a wireless communication module, and a near field communication (NFC) module. To be specific, the Wi-Fi module may communicate by a Wi-Fi method and the Bluetooth module may communicate by a Bluetooth method. When using the Wi-Fi module or the Bluetooth module, various connection information such as service set identifier (SSID) may be transmitted and received for communication connection and then various information may be transmitted and received.

The wireless communication module may communicate according to various communication specifications such as IEEE, Zigbee, 3rd generation (3G), 3rd generation partnership project (3GPP), long term evolution (LTE), 5th generation (5G), or the like. The NFC module may communicate by the NFC method using a 13.56 MHz band among various RF-ID frequency bands such as 135 kHz, 13.56 MHz, 433 MHz, 860-960 MHz, 2.45 GHz, or the like.

According to various embodiments, the processor 140 may receive user data as described above from an external device through the communication interface 150 and may store the received user data in the memory 130.

The microphone 160 may receive a voice signal and convert the received voice signal to an electrical signal. According to an embodiment, the processor 140 may receive a voice signal corresponding to a voice of the user 10, input the received voice signal to a trained voice recognition model to obtain text information corresponding to the voice signal, and identify a control command corresponding to the obtained text information. For example, the user voice may correspond to a control command to change the position of the second area 22 or the size of the second area 22, a control command to change the type of content displayed on the second area 22, or a control command to control content displayed on the second area 22.

The speaker 170 may output audio data under the control of the processor 140. According to an embodiment, the speaker 170 may output a voice signal corresponding to the content displayed on the second area 22, a feedback voice signal corresponding to the voice of the user 10 received through the microphone 160, or a greeting message for the pre-registered user 10.

Although various configurations of the electronic device 100 have been described above, the above-described configurations are merely exemplary, and in the practice of the disclosure, a new configuration may be added or some configuration may be omitted in addition to the configuration as shown in FIG. 9.

Figure 10:
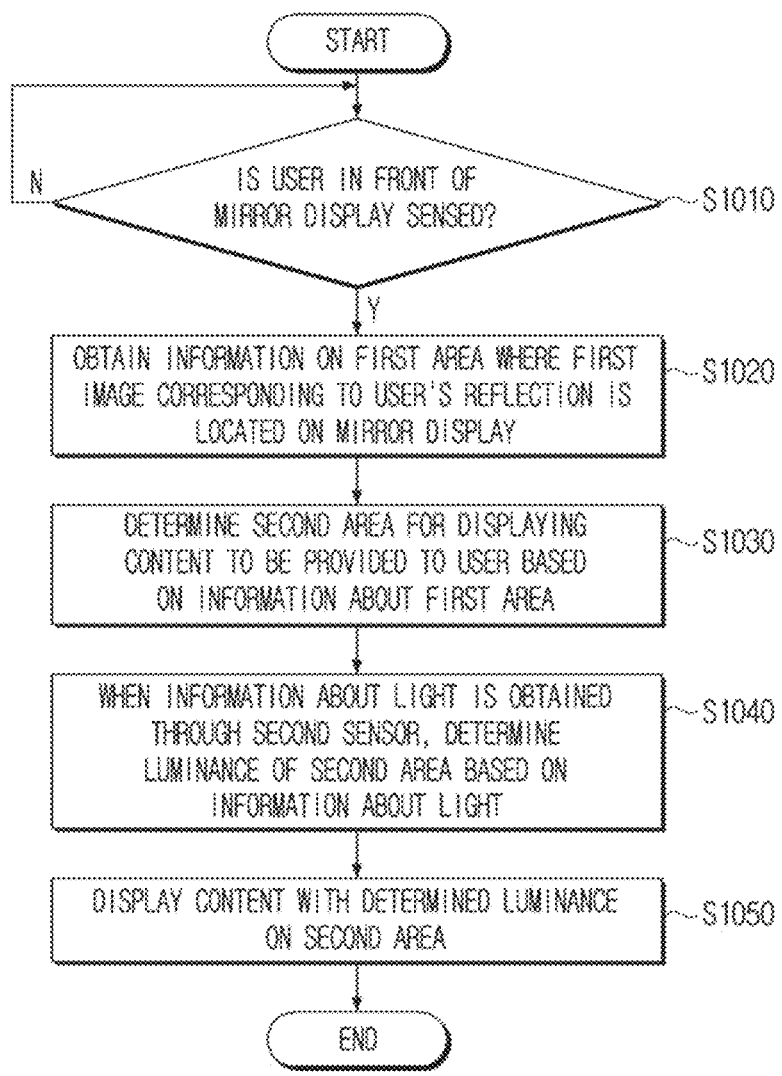
FIG. 10 is a flowchart of a method of controlling an electronic device, according to an embodiment of the disclosure.

FIG. 10 is a flowchart of a method of controlling an electronic device according to an embodiment.

As shown in FIG. 10, the electronic device 100 may sense the user in front of the mirror display in operation S1010. When the user in front of the mirror display is not detected in operation S1010—N, the electronic device 100 may display a standby screen until a user of the front surface of the mirror display is sensed.

If the user of the front surface of the mirror display is sensed in operation S1010—Y, the electronic device 100 may obtain information on the first area in which the first image corresponding to a reflection of a user is reflected off of the mirror display in operation S1020. The information on the first area may include information on the size of the first area and information on the position of the first area.

The electronic device 100 may determine a second area for displaying the content to be provided to the user based on the information about the first area in operation S1030. The electronic device 100 may determine a position and a size of a second area for displaying content on the basis of information on the size of the first area and information on a position of the first area. According to an embodiment, the second area may be determined as one of the areas on the mirror display that is not overlapped with the first area.

The electronic device 100 may obtain information on light incident from the external light source through the second sensor. The information on the light may include information on the direction of the light and information on the intensity of the light.

When information about the light is obtained through the second sensor, the electronic device 100 may determine the luminance of the second area based on the information about the light in operation S1040. The electronic device 100 may display the content with the determined luminance on the second area in operation S1050. According to an embodiment, the processor may determine the luminance of the second area to correspond to the intensity of light incident on the second area, and display the content with the determined luminance on the second area.

The controlling method of the electronic device 100 according to the aforementioned embodiment may be implemented as a program and provided to the electronic device 100. In particular, a program including the controlling method of the electronic device 100 may be stored in a non-transitory computer readable medium and provided.

Specifically, in a computer-readable recording medium including a program for executing a controlling method of the electronic device 100, the controlling method of the electronic device 100 may include the steps of obtaining information on a first area on which a first image corresponding to a user is reflected off of a mirror display when a user of the front surface of the mirror display is sensed; determining a second area for displaying content to be provided to the user on the basis of the information on the first area; determining luminance of the second area on the basis of the information on the light when the information on the light incident from the external light source is obtained; and displaying the content with the determined luminance on the second area.

As described above, the electronic device 100 may determine a second area using information on light incident from an external light source along with information about the first area, determine a first area for displaying the content using information about the pose of the user, and the luminance of the second area may be determined differently according to an object included in the content.

The non-transitory computer readable medium refers to a medium that stores data semi-permanently rather than storing data for a very short time, such as a register, a cache, a memory, etc., and is readable by an apparatus (i.e., executable by at least one processor). In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

A controlling method of the electronic device 100 and a computer-readable recordable medium including a program for executing the controlling method of the electronic device 100 are described, but this is to omit redundant description, and various embodiments of the electronic device 100 may be applied to the controlling method of the electronic device 100 and a computer-readable recordable medium including a program for executing the controlling method of the electronic device 100.

A function related to the foregoing may be performed by a memory and a processor.

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Being provided through learning may refer, for example, to, by applying a learning algorithm to a plurality of learning data, a predefined operating rule or AI model of a desired characteristic being made. The learning may be performed in a device itself in which AI according to an embodiment is performed, and/o may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may include a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The machine-readable storage medium may be provided in the form of a non-transitory storage medium. The, "non-transitory" storage medium may not include a signal (e.g., electromagnetic wave) and is tangible, but does not distinguish whether data is permanently or temporarily stored in a storage medium. For example, the "non-transitory storage medium" may include a buffer in which data is temporarily stored.

According to various embodiments, a method disclosed herein may be provided in a computer program product. A computer program product may be traded between a seller and a purchaser as a commodity. A computer program product may be distributed in the form of a machine readable storage medium (e.g., compact disc ROM (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

In addition, each of the components (e.g., modules or programs) according to various embodiments may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration.

The operations performed by the module, the program, or other component, in accordance with various embodiments may be performed in a sequential, parallel, iterative, or heuristic manner, or at least some operations may be executed in a different order or omitted, or other operations may be added.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100).

When the instruction is executed by a processor, the processor may perform the function corresponding to the instruction, either directly or under the control of the processor, using other components. The instructions may include a code generated or executed by the compiler or interpreter.

While embodiments of the disclosure have been shown and described, it will be understood by those skilled in the art that various changes in form and details may be made therein without departing from the spirit and scope of the disclosure as defined at least by the appended claims and their equivalents.

What is claimed is:

1. An electronic device comprising:
a camera;
a first sensor configured to sense a user;
a second sensor configured to sense light incident from an external light source;
a mirror display; and
a processor configured to:
based on the first sensor sensing the user in front of the mirror display, obtain information about a first area in which a first image corresponding to a reflection of the user is located on the mirror display,
obtain a second image corresponding to the user through the camera,
obtain information about a pose of the user by inputting the second image into a trained first neural network model,
identify, based on the information about the pose of the user, a second area in which the first image corresponding to the reflection of the user is to be located on the mirror display according to a movement of the user during a predetermined period, and
identify a third area for displaying content to be provided to the user, the third area being different from the first are and the second area,
based on information about light being obtained through the second sensor, identify luminance of the third area based on the information about the light, and
control the mirror display to display the content with the identified luminance on the third area.

2. The electronic device of claim 1, wherein the information about the first area comprises information about a size of the first area and information about a position of the first area, and
wherein the processor is further configured to identify a position and a size of the third area based on the information about the size of the first area and the information about the position of the first area.

3. The electronic device of claim 1, wherein the information about the light comprises information about a direction of the light and information about an intensity of the light, and
wherein the processor is further configured to:
identify a position and a size of the third area based on the information about the first area and the information about the direction of the light, and
identify the luminance of the third area based on the information about the intensity of the light.

4. The electronic device of claim 1, wherein the processor is further configured to:
identify types of a plurality of objects within the content, respectively, by inputting data about the content to a trained second neural network model, and
identify luminance of areas corresponding to each of the plurality of objects in the third area based on the information about the light and the types of each of the plurality of objects.

5. The electronic device of claim 1, wherein the processor is further configured to identify the luminance of the third area based on the information about the light, the information about types of the content, and information about brightness of the content.

6. The electronic device of claim 1, wherein the processor is further configured to:
identify a position of a user interface to control the content based on the information about the first area and the information about the third area, and
control the mirror display to display the user interface at the identified position.

7. The electronic device of claim 6, wherein the identified position at least partly overlaps the first area.

8. The electronic device of claim 1, further comprising:
a memory,
wherein the processor is further configured to:
identify whether the user is a pre-registered user based on user data stored in the memory,
based on the user being the pre-registered user, identify the content based on the user data corresponding to the pre-registered user, and
control the mirror display to display the identified content on the third area.

9. The electronic device of claim 8, further comprising:
a communication interface,
wherein the user data is health-related data received from an external device through the communication interface, and
wherein the content comprises recommended content corresponding to the health-related data.

10. The electronic device of claim 1, wherein the processor is further configured to:
process the content so that a boundary area between the first area and the third area is blended, and
control the mirror display to display the processed content on the third area.

11. A method of controlling an electronic device comprising a mirror display, the method comprising:
based on a user on in front of the mirror display being sensed, obtaining information about a first area in which a first image corresponding to a reflection of the user is located on the mirror display;
obtaining a second image corresponding to the user through a camera;
obtaining information about a pose of the user by inputting the second image into a trained first neural network model;
identifying, based on the information about the pose of the user, a second area in which the first image corresponding to the reflection of the user is to be located on the mirror display according to a movement of the user during a predetermined period;
identifying a third area for displaying content to be provided to the user based on the information about the first area, the third area being different from the first area and the second area;
based on information about light being obtained through a second sensor, identifying luminance of the third area based on the information about the light; and
displaying the content with the identified luminance on the third area.

12. The method of claim 11, wherein the information about the first area comprises information about a size of the first area and information about a position of the first area, and
wherein the identifying the third area comprises identifying a position and a size of the third area based on the information about the size of the first area and the information about the position of the first area.

13. The method of claim 11, wherein the information about the light comprises information about a direction of the light and information about an intensity of the light,
wherein the identifying the third area comprises identifying a position and a size of the third area based on the information about the first area and the information about the direction of the light, and
wherein the identifying the luminance of the third area comprises identifying the luminance of the third area based on the information about the intensity of the light.

14. The method of claim 11, wherein the content comprises content including a plurality of objects, and
wherein the identifying the third area further comprises:
identifying types of the plurality of objects, respectively, by inputting data about the content to a second trained neural network model; and
identifying luminance of areas corresponding to each of the plurality of objects in the third area based on the information about the light and the types of each of the plurality of objects.

15. An electronic device comprising:
a camera;
a first sensor configured to sense a user;
a second sensor configured to sense light incident from an external light source;
a mirror display configured to provide a visible reflection of the user while also displaying content; and
a processor configured to:
based on the first sensor sensing the user in front of the mirror display, obtain information about a location of a reflection of the user from a perspective of the user;
obtain an image of a second location of the user through the camera,
obtain information about a pose of the user by inputting the image into a trained first neural network model,
identify, based on the information about the pose of the user, a third location in which the reflection of the user is to be located on the mirror display according to a movement of the user during a predetermined period,
identify a displaying area for displaying content to be provided to the user, the displaying area being different from the location and the second location; and
control the mirror display to display the content on the displaying area.

16. The electronic device of claim 15, wherein the perspective of the user is determined based on determining a position of eyes of the user.

\* \* \* \* \*